US012749698B2

(12) United States Patent
Tu et al.

(10) Patent No.: US 12,749,698 B2
(45) Date of Patent: Sep. 29, 2026

(54) BATTERY ASSEMBLY ASSEMBLING METHOD, CLAMP AND WELDING DEVICE

(71) Applicant: CONTEMPORARY AMPEREX TECHNOLOGY (HONG KONG) LIMITED, Hong Kong (CN)

(72) Inventors: Yinhang Tu, Ningde (CN); Yi Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 664 days.

(21) Appl. No.: 18/138,163

(22) Filed: Apr. 24, 2023

(65) Prior Publication Data

US 2023/0261243 A1 Aug. 17, 2023

Related U.S. Application Data

(63) Continuation of application No. PCT/CN2022/097443, filed on Jun. 7, 2022.

(30) Foreign Application Priority Data

Sep. 30, 2021 (CN) .......................... 202111162915.9

(51) Int. Cl.
*H01M 10/04* (2006.01)
*B23K 37/04* (2006.01)

(52) U.S. Cl.
CPC ..... *H01M 10/0404* (2013.01); *B23K 37/0435* (2013.01)

(58) Field of Classification Search
CPC ... B23K 37/04; B23K 37/0435; H01M 10/00; H01M 10/04; H01M 10/0404
See application file for complete search history.

(56) References Cited

U.S. PATENT DOCUMENTS

2007/0199926 A1 8/2007 Watanabe et al.
2015/0168942 A1 6/2015 Spicer et al.
(Continued)

FOREIGN PATENT DOCUMENTS

CN 103817447 A 5/2014
CN 103904367 A 7/2014
(Continued)

OTHER PUBLICATIONS

Communication under Rule 71(3) EPC issued Apr. 1, 2025 in European Patent Application No. 22 874 257.3.
(Continued)

*Primary Examiner* — C. A. Rivera
(74) *Attorney, Agent, or Firm* — XSENSUS LLP

(57) ABSTRACT

Provided is a battery assembly assembling method, which may include: acquiring a pressing displacement amount of a press; controlling a damper to clamp a battery assembly if an absolute value of a difference between the pressing displacement amount and a standard pressing displacement amount is less than or equal to a preset threshold; acquiring a first actual displacement amount and a first clamping force of the damper; and completing assembling if an absolute value of a difference between the first actual displacement amount and a first standard displacement amount is less than or equal to a first displacement threshold, and an absolute value of a difference between the first clamping force and a first standard clamping force is less than or equal to a first clamping force threshold.

10 Claims, 8 Drawing Sheets

(56) References Cited

U.S. PATENT DOCUMENTS

| | | | |
|---|---|---|---|
| 2019/0198853 A1 | 6/2019 | Nishio et al. | |
| 2020/0368854 A1 | 11/2020 | Kitamura | |

FOREIGN PATENT DOCUMENTS

| | | | | | |
|---|---|---|---|---|---|
| CN | 104302435 | A | | 1/2015 | |
| CN | 205798818 | U | | 12/2016 | |
| CN | 106624412 | A | | 5/2017 | |
| CN | 107825105 | A | * | 3/2018 | ............... B23K 9/12 |
| CN | 108127317 | A | | 6/2018 | |
| CN | 109848600 | A | | 6/2019 | |
| CN | 109909611 | A | | 6/2019 | |
| CN | 110052705 | A | | 7/2019 | |
| CN | 110210163 | A | | 9/2019 | |
| CN | 110625278 | A | | 12/2019 | |
| CN | 209754370 | U | | 12/2019 | |
| CN | 110814609 | A | | 2/2020 | |
| CN | 110961783 | A | | 4/2020 | |
| CN | 210334942 | U | | 4/2020 | |
| CN | 111931312 | A | | 11/2020 | |
| CN | 111975250 | A | | 11/2020 | |
| CN | 112222759 | A | | 1/2021 | |
| CN | 113020825 | A | | 6/2021 | |
| CN | 113113655 | A | | 7/2021 | |
| CN | 115890095 | A | * | 4/2023 | ......... B23K 37/0435 |
| JP | H08197342 | A | | 8/1996 | |
| KR | 102089497 | B1 | | 3/2020 | |

OTHER PUBLICATIONS

Extended European Search Report issued Jun. 27, 2024 in European Patent Application No. 22874257.3.

International Search Report and Written Opinion mailed on Sep. 2, 2022, received for PCT Application PCT/CN2022/097443, filed on Jun. 7, 2022, 13 pages including English Translation.

Li et al., "Laser Welding Process of Power Battery Shell", Welding Technology, vol. 42, No. 7, Jul. 2013, pp. 30-32.

Chinese Office Action issued Sep. 1, 2023 in corresponding Chinese Patent Application No. 202111162915.9 (with machine-generated English translation), 16 pages.

Lin Mengdan, et al., "Semi-automatic welding equipment of the collector sheet design", Welding, Issue #03, Mar. 25, 2018.

* cited by examiner

BATTERY ASSEMBLY ASSEMBLING METHOD, CLAMP AND WELDING DEVICE

CROSS-REFERENCE TO RELATED APPLICATIONS

The present application is a continuation of International Application No. PCT/CN2022/097443, filed Jun. 7, 2022, which claims priority to the Chinese patent application No. 202111162915.9 entitled "Battery Assembly Assembling Method, Clamp, and Welding Device" filed on Sep. 30, 2021, each of which is incorporated herein by reference in its entirety.

TECHNICAL FIELD

The present application relates to the technical field of batteries, in particular to a battery assembly assembling method, a clamp and a welding device.

BACKGROUND

A battery housing and an end cover are generally fixed by welding. Before welding, the end cover needs to be pressed to align with a reference plate through a pressing device and riveted into an opening of the housing, so that a top face of the end cover is flush with a top face of the housing, and then the housing is clamped through a clamping device from all sides to ensure the reliability of subsequent welding. However, the inventors found that in an actual process, due to the inaccuracy of a clamping position and a clamping force, welding failure or poor welding of a battery housing and an end cover often occurs, which results in the scrapping of a battery.

SUMMARY

In view of the above problems, the present application provides a battery assembly assembling method, a clamp and a welding device to solve the problem that a clamping position and a clamping force of a battery assembly cannot be determined.

According to one aspect of an embodiment of the present application, provided is a battery assembly assembling method, applied to a battery assembly clamp including a pressing device or press and a clamping device or claimper, the method including: acquiring an actual pressing displacement amount of the pressing device moving downward; detecting the actual pressing displacement amount; controlling the clamping device to clamp the battery assembly from a first side face of the battery assembly if an absolute value of a difference between the actual pressing displacement amount and a preset standard pressing displacement amount is less than or equal to a preset pressing threshold; acquiring a first actual displacement amount of the clamping device and a first clamping force of the clamping device performing clamping from the first side face of the battery assembly; detecting the first actual displacement amount and the first clamping force; and completing assembling if an absolute value of a difference between the first actual displacement amount and a preset first standard displacement amount is less than or equal to a preset first displacement threshold, and an absolute value of a difference between the first clamping force and a preset first standard clamping force is less than or equal to a preset first clamping force threshold.

In the present application, on the one hand, after determining that an absolute value of a difference between an actual pressing displacement amount and a preset standard pressing displacement amount is less than or equal to a preset pressing threshold, a clamping operation is then performed to ensure that a welding surface of a battery assembly is aligned with a reference plane so that a defocusing amount of the welding meets requirements and welding effect is ensured. On the other hand, in the clamping operation, by simultaneously determining an absolute value of a difference between a first actual displacement amount and a preset first standard displacement amount is less than or equal to a preset first displacement threshold, and an absolute value of a difference between a first clamping force and a preset first standard clamping force is less than or equal to a preset first clamping force threshold, it not only ensures that a displacement amount of a clamping device meets requirements, and at the same time, it also ensures that a clamping force applied to the battery assembly also meets requirements, thereby ensuring that there will be no errors in production sizes of the battery assembly, and welding seams that do not meet requirements, which can effectively avoid situations such as welding failure and scrapping of the battery assembly.

In an optional manner, if the absolute value of the difference between the actual pressing displacement amount and the preset standard pressing displacement amount is greater than the preset pressing threshold, the pressing device is controlled to move upward to be reset and press downward again. When the absolute value of the difference between the actual pressing displacement amount and the preset standard pressing displacement amount is greater than the preset pressing threshold, the pressing device is controlled to be reset and press downward again, which can quickly eliminate the situation that the pressing displacement amount is not up to standard caused by some accidental reasons of the pressing device or structure, and reduce the time cost of assembling.

In an optional manner, if the absolute value of the difference between the first actual displacement amount and the preset first standard displacement amount is greater than the preset first displacement threshold, the clamping device is controlled to be reset and perform clamping again. The situation that the clamping displacement amount is not up to standard due to some accidental reasons of the clamping device or structure can be quickly eliminated, and the time cost of assembling can be reduced.

In an optional manner, if the absolute value of the difference between the first clamping force and the preset first standard clamping force is greater than the preset first clamping force threshold, the clamping device is controlled to be reset and perform clamping again. The situation that the clamping force is not up to standard due to some accidental reasons in the clamping device or structure can be quickly eliminated, and the time cost of assembling can be reduced.

In an optional manner, the method further includes: controlling the clamping device to clamp the battery assembly from a second side face of the battery assembly that is adjacent to the first side face; acquiring a second actual displacement amount of the clamping device and a second clamping force of the clamping device clamping the second side face of the battery assembly; detecting the second actual displacement amount and the second clamping force; and completing the assembling if an absolute value of a difference between the second actual displacement amount and a preset second standard displacement amount is less than or equal to a preset second displacement threshold, and an absolute value of a difference between the second clamping force and a preset second standard clamping force is less than or equal to a preset second clamping force threshold. By adding the step of controlling the clamping device to clamp the battery from the second side face of the battery assembly, and detecting the second actual displacement amount and the second clamping force, it can ensure that the battery assembly is fully clamped all around, and further ensure that all points of a welding seam between an end cover and a housing of the battery assembly meet welding requirements, ensure success rate of welding, and improve welding effect.

According to another aspect of an embodiment of the present application, provided is a battery assembly clamp, including: a control unit or controller, and a pressing device or press, a clamping device or damper, a first feedback unit or structure and a second feedback unit or structure respectively electrically connected to the control unit, where the pressing device is configured to press and drive a battery assembly to move downward; the first feedback unit is disposed on the pressing device, and is configured to detect an actual pressing displacement amount of the pressing device moving downward and send the actual pressing displacement amount to the control unit; the clamping device is configured to carry the battery assembly, and clamp the battery assembly from a first side face of the battery assembly; the second feedback unit is disposed on the clamping device, and is configured to detect a first actual displacement amount of the clamping device and a first clamping force of the clamping device performing clamping from the first side face of the battery assembly, and send the first actual displacement amount and the first clamping force to the control unit; the control unit is configured to control the pressing device to move downward, acquire the actual pressing displacement amount of the pressing device moving downward, and control the clamping device to clamp the battery assembly from the first side face according to the actual pressing displacement amount; and the control unit is further configured to acquire the first actual displacement amount of the clamping device and the first clamping force of the clamping device performing clamping from the first side face, and determine whether assembling is completed according to the first actual displacement amount and the first clamping force.

By disposing the first feedback unit on the pressing device, the first feedback unit is configured to detect the actual pressing displacement amount of the pressing device moving downward and send the actual pressing displacement amount to the control unit so as to realize precise positioning of the battery assembly. By disposing the second feedback unit on the clamping device, the second feedback unit is configured to detect the first actual displacement amount and the first clamping force of the clamping device and send the first actual displacement amount and the first clamping force to the control unit so as to ensure the accuracy of the clamping position and clamping force of the clamping device for the battery assembly, and further ensure that conditions such as a defocusing amount and a welding seam during the subsequent welding of the battery assembly meet requirements.

In an optional manner, the first feedback unit includes a displacement sensor. By setting the first feedback unit as a displacement sensor, it can effectively ensure the accurate measurement of the pressing displacement amount of the pressing device, thereby ensuring that a defocusing amount between a welding plane and a welding head of the battery assembly meet requirements, and ensuring success rate of welding.

In an optional manner, a carrying platform for placing the battery assembly is disposed in the clamping device, a bottom of the carrying platform is connected to the clamping device through a first elastic member or structure, and the first elastic member is configured to provide an upward elastic force for the carrying platform. The bottom of the carrying platform is connected to the clamping device through the first elastic member, and the first elastic member is configured to provide an upward elastic force for the carrying platform, which on the one hand ensures the stability of the battery assembly when it is placed on the carrying platform, and on the other hand, ensures that when the battery assembly is discharged, the battery assembly can be sent out from the top of the clamping device through the first elastic member.

In an optional manner, a restraint plate is disposed in the clamping device, a movable first clamping plate is disposed at a position opposite to the restraint plate in the clamping device, and the first clamping plate is configured to clamp the battery assembly from the first side face of the battery assembly when the first clamping plate moves, so that the battery assembly is clamped between the first clamping plate and the restraint plate. By disposing the restraint plate in the clamping device, and setting the movable first clamping plate at a position opposite to the restraint plate, the battery assembly can be firmly clamped between the first clamping plate and the restraint plate when the first clamping plate moves.

In an optional manner, the second feedback unit includes an electric cylinder, and the electric cylinder is connected to the first clamping plate for driving the first clamping plate to move. By setting the second feedback unit as an electric cylinder, and the electric cylinder to be connected to the first clamping plate, not only the driving of the first clamping plate is realized, but also detection and feedback of the first actual displacement amount of the first clamping plate as well as the first clamping force of the first clamping plate for the battery assembly can be realized.

In an optional manner, the first clamping plate is connected to the electric cylinder through a second elastic member or structure, so that the first clamping plate is able to be tilted against the first side face of the battery assembly. The first clamping plate is connected to the electric cylinder through the second elastic member so that the first clamping plate is able to be tilted to a certain extent. If the first side face of the battery assembly is tilted to a certain extent due to production reasons, the first clamping plate moves and contacts the first side face of the battery assembly so as to clamp the battery assembly, the first clamping plate is able to be tilted correspondingly with the tilting of the first side face, so that the first clamping plate exerts the more uniform clamping force on the first side face of the battery assembly, and exhibits an ability of self-adaptive adjustment for clamping the battery assembly to ensure the reliability of clamping.

In an optional manner, a movable second clamping plate is further disposed in the clamping device, and the second clamping plate is configured to clamp the battery assembly from a second side face of the battery assembly that is adjacent to the first side face when the second clamping plate moves. By disposing the movable second clamping plate in the clamping device, the second clamping plate is configured to clamp the battery assembly from the second side face of the battery assembly that is adjacent to the first side face when the second clamping plate moves, so as to clamp the battery assembly completely and fully, thereby ensuring that a welding seam on a welding plane of the battery assembly meets requirements and ensuring success rate of welding.

In an optional manner, both the restraint plate and the first clamping plate are able to move in a moving direction of the second clamping plate. By setting the restraint plate and the first clamping plate to be able to move in the moving direction of the second clamping plate, it ensures that when the second clamping plate moves and clamps the battery assembly, the first clamping plate and the restraint plate can move with the battery assembly to prevent friction between the battery assembly and the first clamping plate and the restraint plate, so as not to cause abrasion or even damage to the surface of the battery assembly.

The control unit is configured to: detect an actual pressing displacement amount; control the clamping device to clamp the battery assembly from the first side face of the battery assembly if an absolute value of a difference between the actual depressing displacement amount and a preset standard depressing displacement amount is less than or equal to a preset depressing threshold; detect the first actual displacement amount and the first clamping force; and determine that the assembling is completed if an absolute value of a difference between the first actual displacement amount and a preset first standard displacement amount is less than or equal to a preset first displacement threshold, and an absolute value of a difference between the first clamping force and a preset first standard clamping force is less than or equal to a preset first clamping force threshold. In the present application, on the one hand, after determining that an absolute value of a difference between an actual pressing displacement amount and a preset standard pressing displacement amount is less than or equal to a preset pressing threshold, a clamping operation is then performed to ensure that a welding surface of a battery assembly is aligned with a reference plane so that a defocusing amount of the welding meets requirements and welding effect is ensured. On the other hand, in the clamping operation, by simultaneously determining an absolute value of a difference between a first actual displacement amount and a preset first standard displacement amount is less than or equal to a preset first displacement threshold, and an absolute value of a difference between a first clamping force and a preset first standard clamping force is less than or equal to a preset first clamping force threshold, it not only ensures that a displacement amount of a clamping device meets requirements, and at the same time, it also ensures that a clamping force applied to the battery assembly also meets requirements, thereby ensuring that there will be no errors in production sizes of the battery assembly, and welding seams that do not meet requirements, which can effectively avoid situations such as welding failure and scrapping of the battery assembly.

According to yet another aspect of an embodiment of the present application, provided is a welding device, including the battery assembly clamp in any of the above manners.

The welding device is applied in the production line of a battery. When the battery assembly is clamped in the battery assembly clamp, the pressing device moves upward, so that structures between the pressing device and the clamping device no longer interfere with each other, and then the clamping device is transferred to a welding station of the welding device for welding.

The above description is only an overview of the technical solutions of the present application. In order to understand the technical means of the present application more clearly, implementation can be made according to the contents of the specification, and in order to make the above and other purposes, features and advantages of the present application more obvious and understandable, the following specifically lists the specific embodiments of the present application.

BRIEF DESCRIPTION OF THE DRAWINGS

Various other advantages and benefits will become apparent to those of ordinary skill in the art upon reading the following detailed description of the preferred embodiments. The drawings are only for the purpose of illustrating the preferred embodiments and are not construed as limiting the present application. Moreover, in the whole drawings, like reference numerals are used to denote like components. In the drawings.

Figure 1:
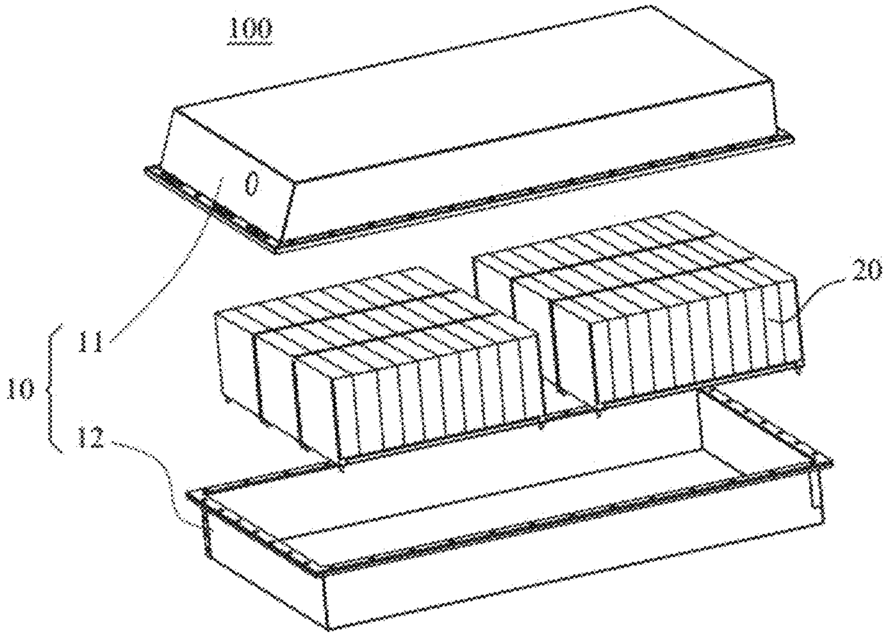
FIG. 1 is a schematic diagram of an exploded structure of a battery provided by an embodiment of the present application.

Reference numerals in the specific embodiments are as follows:

battery 100, box 10, first part 11, second part 12;

battery cell 20, end cover 21, electrode terminal 21*a*, housing 22, battery cell assembly 23, tab 23*a;* battery assembly clamp 500, control unit 510, pressing device 520, cylinder 521, pressing block 522, clamping device 530, first clamping plate 531, carrying platform 532, first elastic member 533, restraint plate 534, second elastic member 535, second clamping plate 536, fixing plate 537, first slide rail 538, second slide rail 539, first feedback unit 540, displacement sensor 541, second feedback unit 550, electric cylinder 551, cylinder barrel 5511, telescopic rod 5512, battery assembly 600.

DESCRIPTION OF EMBODIMENTS

Embodiments of the technical solutions of the present application will be described in detail below in conjunction with the accompanying drawings. The following embodiments are only used to illustrate the technical solutions of the present application more clearly, and therefore are only examples, rather than limiting the protection scope of the present application.

It should be noted that, unless otherwise specified, technical terms or scientific terms used in the embodiments of the present application shall have common meanings understood by those skilled in the art to which the embodiments of the present application pertains.

In the description of the embodiments of the present application, orientations or positional relationships indicated by technical terms "center", "longitudinal", "lateral", "length", "width", "thickness", "upper", "lower", "front", "rear", "left", "right", "vertical" "horizontal", "top", "bottom", "inner", "outer", "clockwise", "counterclockwise", "axial", "radial", "circumferential", or the like are based on orientations or positional relationships shown in the drawings, and are only for the convenience of describing the embodiments of the present application and simplifying the description, and do not indicate or imply that a device or element referred to must have a specific orientation, be constructed and operated in a specific orientation, and therefore cannot be understood as limitations to the embodiments of the present application.

In addition, technical terms such as "first" and "second" are only used for descriptive purposes, and should not be understood as indicating or implying relative importance or implicitly specifying the number of the indicated technical features. In the description of the embodiments of the present application, "plurality" means two or more, unless otherwise specifically defined.

In the description of the embodiments of the present application, unless otherwise clearly specified and defined, technical terms such as "installation", "interconnection", "connection" and "fixation" should be interpreted in a broad sense, for example, it can be a fixed connection, or a detachable connection, or an integrated connection; it can also be a mechanical connection, or an electrical connection; it can be a direct connection, or an indirect connection through an intermediary, and it can be internal communication between two elements or interaction relationship between two elements. Those of ordinary skill in the art can understand the specific meanings of the above terms in the embodiments of the present application according to specific situations.

In the description of the embodiments of the present application, unless otherwise explicitly specified and defined, when a first feature is "above" or "below" a second feature, the first feature and the second feature may be in direct contact, or the first feature and the second feature may be in indirect contact through an intermediary. Moreover, when the first feature is "on", "above" and "over" the second feature, the first feature may be directly above or obliquely above the second feature, or the first feature may be simply higher than the second feature in the horizontal height. When the first feature is "under", "below" and "underneath" the second feature, the first feature may be directly below or obliquely below the second feature, or the first feature may be simply lower than the second feature in the horizontal height.

At present, judging from the development of market situation, application of power batteries is becoming more and more extensive. Power batteries are not only applied in energy storage power systems such as hydraulic, thermal, wind and solar power plants, but also widely applied in electric vehicles such as electric bicycles, electric motorcycles, and electric vehicles, as well as military equipment and aerospace and other fields. With the continuous expansion of application fields of the power batteries, their market demand is also constantly expanding.

In an automatic production line of a battery, an end cover and a housing of the battery are sealed and assembled by welding. Before welding, it is necessary to first rivet an end cover into a housing and guarantee that an end surface of the end cover is on the same plane as that of the housing, so as to ensure that a welding surface of the end cover is aligned with that of the housing. At the same time, in order to make a welding seam between the end cover and the housing meet requirements, it is necessary to clamp an edge of the housing by a clamp all around to reduce the gap between the end cover and the housing.

The welding between the end cover and the housing is generally carried out by laser welding, and a defocusing amount of laser welding has a great influence on welding quality. The defocusing amount is a distance between a laser focus and an acted substance. Laser welding usually requires a certain defocusing amount, because a power density at the center of a spot at the laser focus is too high, so that a hole is easy to be formed through evaporation, while power density distribution is relatively uniform on each plane away from the laser focus. Therefore, in the process of laser welding, high requirements are put forward for the accuracy of positioning of the end cover and the housing.

Before welding, the end cover is generally pressed to be aligned with a reference plate and riveted into an opening of the housing by the pressing device. When a screw bolt in the structure of the reference plate is loose, or there are abnormalities such as impurities on the surface of the reference plate, whether the end cover is aligned with the reference plate cannot be determined, which will lead to subsequent welding failure; and when the edge of the housing is clamped by the clamp, a too small clamping force easily causes a welding seam between the end cover and the housing to be too large, which will also lead to welding failure, while a too large clamping force also easily leads to deformation of the housing or the end cover.

In the current production line, a battery assembly realizes the alignment of top faces of an end cover and a housing with a welding reference plane through a restraint structure on a pressing device. Specifically, when a structural size is set, the pressing device is guaranteed to press downward to the maximum stroke, the top faces of the end cover and the housing are aligned with the welding reference plane. Similarly, by disposing the restraint structure on a clamping device, a side face of the housing can be clamped so that the size of a welding seam can meet welding requirements.

The inventors of the present application notice that, for the method of using the restraint structure to realize the alignment of the top faces of the end cover and the housing with the welding reference plane, when there are impurities between a contact face of the pressing device and the battery assembly or on a surface of the restraint structure, it will cause the maximum stroke of the pressing device to decrease, which results in insufficient positioning of the top faces of the end cover and the housing, and further failure of subsequent welding, scrapping of a battery, and the like. Similarly, when there are impurities between the clamping device and a side face of the battery assembly or on the surface of the restraint structure on the clamping device, a clamping force of the clamping device for the housing will be insufficient and the clamping force will be unevenly distributed, which results in the gap between the housing and the end cover is too large, and affects the effect of subsequent welding.

Based on this, the present application proposes a battery assembly assembling method, and the method is applied to a battery assembly clamp during a welding process, including determining whether pressing positioning of a battery assembly meets requirements by comparing an absolute value of a difference between an actual pressing displacement amount of a pressing device moving downward and a preset standard pressing displacement amount with a preset pressing threshold, and when the requirements are met, determining whether assembling is completed by comparing an absolute value of a difference between a first displacement amount of a clamping device and a preset first standard displacement amount with a first displacement threshold, and an absolute value of a difference between a first clamping force of the clamping device and a preset first standard clamping force with a first clamping force threshold. The present application obtains various assembling data synchronously when the battery assembly is assembled on the clamp, and compares the various assembling data with standard data, so as to ensure whether the positioning, clamping and other conditions of the battery assembly meet requirements during an assembling process. When the requirements are met, the battery assembly assembled on the clamp can be welded to ensure success rate of welding and avoid situations such as welding failure and scrapping of the battery assembly due to poor assembling of the battery assembly on the clamp.

Please refer to FIG. 1, FIG. 1 is a schematic diagram of an exploded structure of a battery 100 provided by some embodiments of the present application. The battery 100 includes a box 10 and a battery cell 20, and the battery cell 20 is accommodated in the box 10. The box 10 is configured to provide accommodation space for the battery cell 20, and the box 10 may adopt a variety of structures. In some embodiments, the box 10 may include a first part 11 and a second part 12, the first part 11 and the second part 12 cover each other, and the first part 11 and the second part 12 jointly define the accommodation space for accommodating the battery cell 20. The second part 12 may be a hollow structure with one end open, the first part 11 may be a plate-like structure, and the first part 11 covers an opening side of the second part 12, so that the first part 11 and the second part 12 jointly define the accommodation space; or the first part 11 and the second part 12 may be hollow structures with one side open, and an opening side of the first part 11 covers the opening side of the second part 12. Certainly, the box 10 formed by the first part 11 and the second part 12 may be in various shapes, such as a cylinder, a cuboid and the like.

In the battery 100, a plurality of battery cells 20 may be provided. The plurality of battery cells 20 may be in series connection, parallel connection or series-parallel connection, and the series-parallel connection means that the plurality of battery cells 20 are connected in series and parallel. The plurality of battery cells 20 may be in direct series connection, parallel connection or series-parallel connection, and then the whole composed of the plurality of battery cells 20 is accommodated in the box 10. Certainly, for the battery 100, the plurality of battery cells 20 may be firstly connected in series, in parallel or in series-parallel to form a battery module, and then a plurality of battery modules are connected in series or in parallel or in series-parallel to form a whole, and then accommodated in the box 10. The battery 100 may also include another structure, for example, the battery 100 may also include a bus component configured to implement electrical connection between the plurality of battery cells 20.

Each battery cell 20 may be but not limited to a secondary battery or a primary battery, or may also be a lithium-sulfur battery, a sodium-ion battery or a magnesium-ion battery. The battery cell 20 may be cylindrical, flat, cuboid or in another shape.

Figure 2:
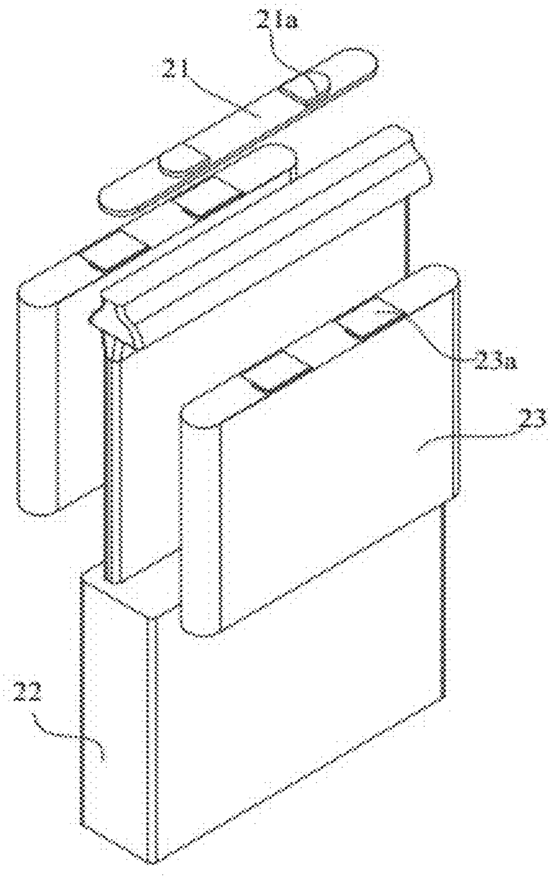
FIG. 2 is a schematic diagram of an exploded structure of a battery cell provided by an embodiment of the present application.

Please refer to FIG. 2, FIG. 2 is a schematic diagram of an exploded structure of a battery cell 20 in a battery 100 provided by some embodiments of the present application. The battery cell 20 refers to the smallest unit for constituting the battery. As shown in FIG. 2, the battery cell 20 includes an end cover 21, a housing 22, a battery cell assembly 23 and other functional components.

The end cover 21 refers to a component that covers an opening of the housing 22 to isolate internal environment of the battery cell 20 from external environment. Without limitation, the end cover 21 may be adapted to the housing 22 in shape to fit the housing 22. Optionally, the end cover 21 may be made of a material with a certain hardness and strength (such as aluminum alloy), and in this way, the end cover 21 does not easily deform when it is squeezed and collided, so that the battery cell 20 can have a higher structural strength and safety performance can also be improved. A functional component such as an electrode terminal 21*a* may be disposed on the end cover 21. The electrode terminal 21*a* may be configured to be electrically connected with the battery cell assembly 23 for outputting or inputting electric energy of the battery cell 20. In some embodiments, a pressure relief mechanism may be further disposed on the end cover 21, and the pressure relief mechanism is configured to relieve an internal pressure when the internal pressure or temperature of the battery cell 20 reaches a threshold. The end cover 21 may also be made of various materials, for example, copper, iron, aluminum, stainless steel, aluminum alloy, plastic, or the like, which is not particularly limited in the embodiment of the present application. In some embodiments, an insulating member may be further disposed on an inner side of the end cover 21, and the insulating member may be configured to isolate an electrical connection component in the housing 22 from the end cover 21 to reduce the risk of short circuit. Exemplarily, the insulating member may be plastic, rubber or the like.

The housing 22 is a component configured to cooperate with the end cover 21 to form the internal environment of the battery cell 20, where the formed internal environment may be used to accommodate the battery cell assembly 23, an electrolytic solution and other components. The housing 22 and the end cover 21 may be independent components, an opening may be provided on the housing 22, and the end cover 21 covers the opening at the opening to form the internal environment of the battery cell 20. Without limitation, the end cover 21 and the housing 22 may also be integrated. Specifically, the end cover 21 and the housing 22 may form a common connecting face first before other components are placed into the housing. When the interior of the housing 22 needs to be packaged, the end cover 21 then covers the housing 22. The housing 22 may be in various shapes and sizes, such as a cuboid, a cylinder, and a hexagonal prism. Specifically, the shape of the housing 22 may be determined according to the specific shape and size of the battery cell assembly 23. The housing 22 may be made of various materials, for example, copper, iron, aluminum, stainless steel, aluminum alloy, and plastic, which is not particularly limited in the embodiments of the present application.

The battery cell assembly 23 is a component in the battery cell 20 where an electrochemical reaction occurs. The housing 22 may contain one or more battery cell assemblies 23. The battery cell assembly 23 is mainly formed by winding or stacking a positive electrode sheet and a negative electrode sheet, and a separator is usually disposed between the positive electrode sheet and the negative electrode sheet. Parts of the positive electrode sheet and the negative electrode sheet with active materials constitute a main body part of the battery cell assembly, and parts of the positive electrode sheet and the negative electrode sheet without active materials constitute tabs 23*a* respectively. A positive tab and a negative tab may be located at one end of the main body part together or at two ends of the main body part respectively. During the charging and discharging of the battery, a positive electrode active material and a negative electrode active material react with the electrolytic solution, and the tab 23*a* is connected to the electrode terminal 21*a* to form a current loop.

Figure 3:
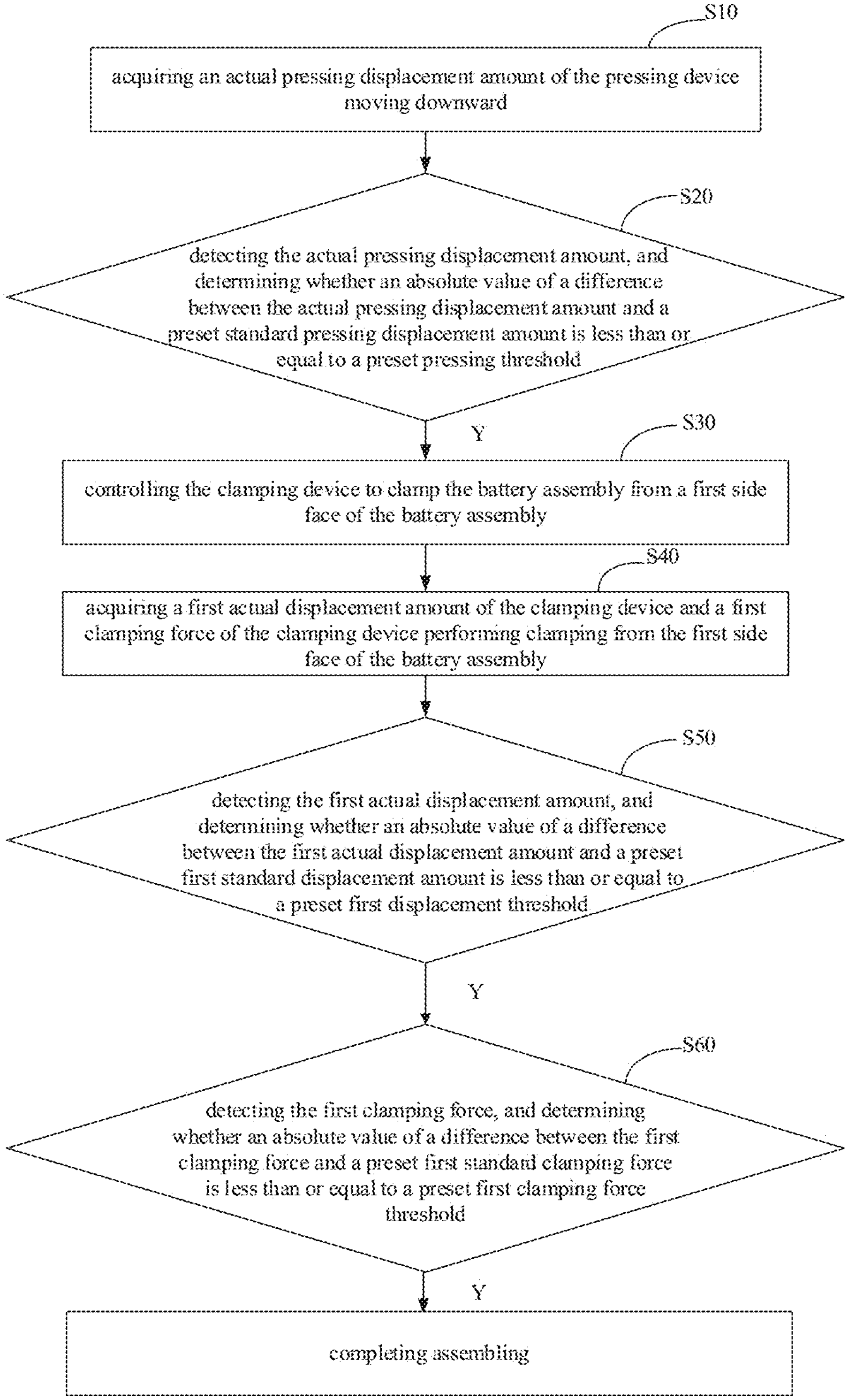
FIG. 3 is a schematic flow chart of a battery assembly assembling method provided by an embodiment of the present application.

According to one aspect of embodiments of the present application, provided is a battery assembly assembling method, the method is applied to a battery assembly clamp, and the battery assembly clamp includes a pressing device and a clamping device. Please refer to FIG. 3 for details, FIG. 3 shows a flow of a battery assembly assembling method provided by an embodiment of the present application. The battery assembly assembling method includes:

Step S10: acquiring an actual pressing displacement amount of the pressing device moving downward.

Specifically, since a control unit controls the pressing device to press and drive a battery assembly to move downward, a displacement sensor or a drive feedback mechanism (for example, an electric cylinder) may be disposed on the pressing device, so that the control unit can acquire the actual pressing displacement amount of the pressing device moving downward, so as to indirectly acquire an actual pressing displacement amount of the battery assembly moving downward.

Step S20: detecting the actual pressing displacement amount, and determining whether an absolute value of a difference between the actual pressing displacement amount and a preset standard pressing displacement amount is less than or equal to a preset pressing threshold.

Specifically, the control unit first compares the actual pressing displacement amount with the preset standard pressing displacement amount to obtain the absolute value of the difference, and then compares the obtained absolute value of the difference with the preset pressing threshold to determine whether the actual pressing displacement amount meets requirements.

If the absolute value of the difference between the actual pressing displacement amount and the preset standard pressing displacement amount is less than or equal to the preset pressing threshold, it indicates that the actual pressing displacement amount meets the requirements, and then the flow proceeds to Step S30: controlling the clamping device to clamp the battery assembly from a first side face of the battery assembly.

Specifically, the control unit controls the clamping device to clamp the battery assembly from the first side face of the battery assembly. It can be understood that in the specific operation process, the battery assembly may be clamped from only the first side face of the battery assembly, or the battery assembly is clamped from the other side face of the battery assembly on the basis of performing clamping from the first side face, and the other side of the battery assembly may be adjacent to the first side face or opposite to the first side face.

Step S40: acquiring a first actual displacement amount of the clamping device and a first clamping force of the clamping device performing clamping from the first side face of the battery assembly.

Specifically, a displacement sensor, a force sensor, a drive feedback device, or the like may be disposed on the clamping device so that the control unit can acquire the first actual displacement amount of the clamping device clamping the battery assembly from the first side face of the battery assembly and the first clamping force of the clamping device performing clamping from the first side face of the battery assembly.

Step S50: detecting the first actual displacement amount, and determining whether an absolute value of a difference between the first actual displacement amount and a preset first standard displacement amount is less than or equal to a preset first displacement threshold.

Specifically, the control unit compares the first actual displacement amount with the preset first standard displacement amount to obtain the absolute value of the difference, and then compares the obtained absolute value of the difference with the preset first displacement threshold to determine whether the first actual displacement amount meets requirements.

If the absolute value of the difference between the first actual displacement amount and the preset first standard displacement amount is less than or equal to the preset first displacement threshold, it indicates that the first actual displacement amount meets the requirements, and then the flow proceeds to Step S60: detecting the first clamping force, and determining whether an absolute value of a difference between the first clamping force and a preset first standard clamping force is less than or equal to a preset first clamping force threshold.

Specifically, the control unit compares the first clamping force with the preset first standard clamping force to obtain the absolute value of the difference, and then compares the obtained absolute value of the difference with the preset first clamping force threshold to determine whether the first clamping force meets requirements.

If the absolute value of the difference between the first clamping force and the preset first standard clamping force is less than or equal to the preset first clamping force threshold, it indicates that the first clamping force meets the requirements, and assembling is completed.

Specifically, the pressing device is configured to press an end cover to be aligned with a reference plane and riveted into an opening of a housing, and the clamping device is configured to squeeze the housing to reduce the gap between an edge of the housing opening and the end cover. The first side face of the battery assembly is one side face of the housing used to enclose the opening. Similarly, a second side face of the battery assembly mentioned below is the other side face of the housing used to enclose the opening.

The inventors of the present application found in the research that when a displacement amount of a clamping device is small but a clamping force is appropriate, adaptability of a contact face between the clamping device and the battery assembly may be poor, and the clamping device may be only in partial contact with the battery assembly, so that the clamping force of the clamping device for the surface of the battery assembly is unevenly distributed, which results that a welding seam between an end cover and a housing only partially meets requirements; when the displacement amount of the clamping device is large but the clamping force is appropriate, the battery assembly may be squeezed and deformed; when the displacement amount of the clamping device is appropriate but the clamping force is small, errors may occur in the production process of the battery assembly, which results in that the size of the battery assembly is too small; and when the displacement amount of the clamping device is appropriate but the clamping force is large, on the one hand, the size of the battery assembly may be too large, and on the other hand, a surface of the battery housing may be uneven, so that the clamping device is in partial contact with the surface of the battery housing, and a force on the surface of the battery housing is uneven, which will also cause only part of the welding seam to meet requirements.

Based on the above problems, in the present application, on the one hand, after determining that an absolute value of a difference between an actual pressing displacement amount and a preset standard pressing displacement amount is less than or equal to a preset pressing threshold, a clamping operation is then performed to ensure that a welding surface of a battery assembly is aligned with a reference plane so that a defocusing amount of the welding meets requirements and welding effect is ensured. On the other hand, in the clamping operation, by simultaneously determining an absolute value of a difference between a first actual displacement amount and a preset first standard displacement amount is less than or equal to a preset first displacement threshold, and an absolute value of a difference between a first clamping force and a preset first standard clamping force is less than or equal to a preset first clamping force threshold, it not only ensures that a displacement amount of a clamping device meets requirements, and at the same time, it also ensures that a clamping force applied to the battery assembly also meets requirements, thereby ensuring that there will be no errors in production sizes of the battery assembly, and welding seams that do not meet requirements, which can effectively avoid situations such as welding failure and scrapping of the battery assembly.

Figure 4:
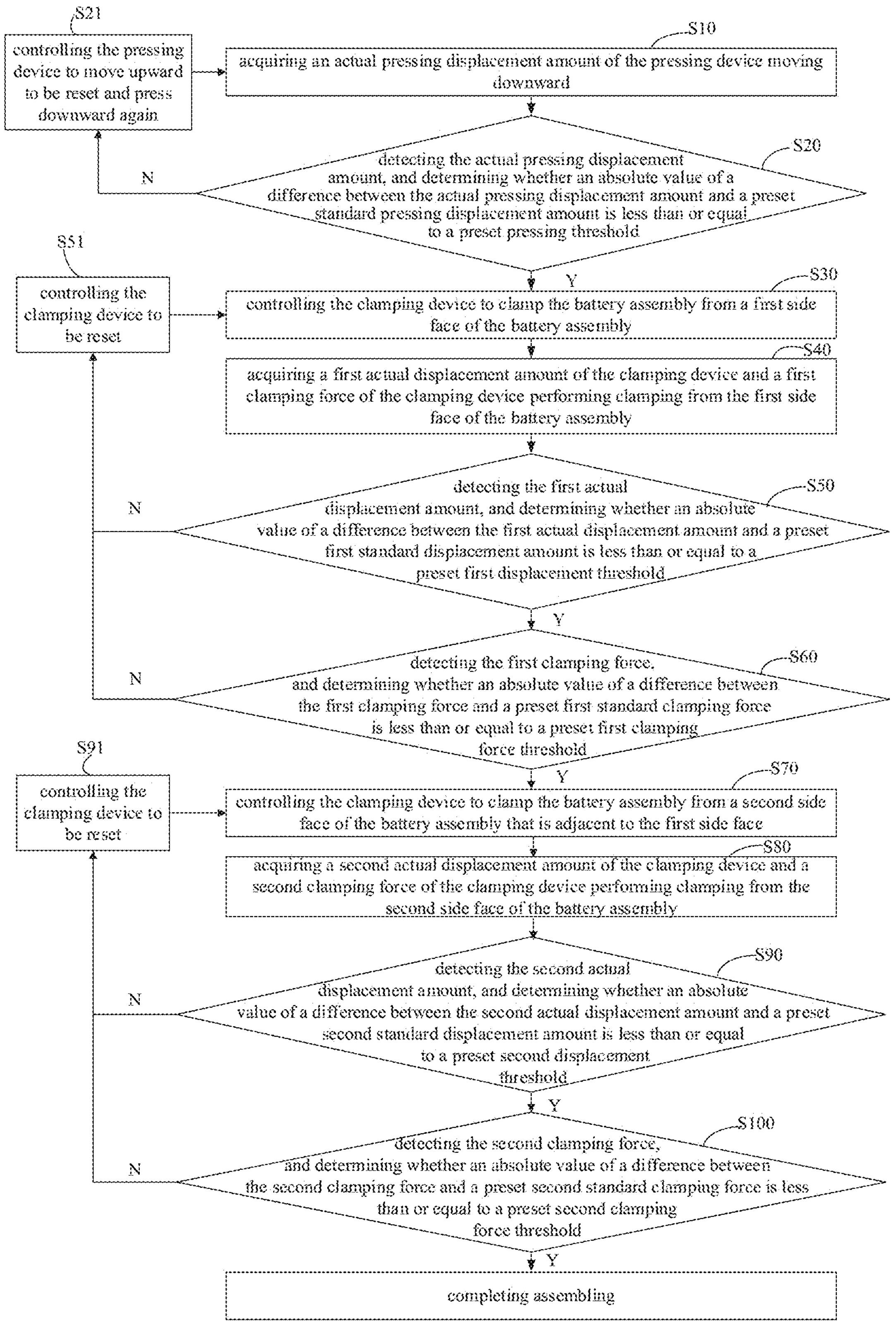
FIG. 4 is a schematic flow chart of a battery assembly assembling method provided by another embodiment of the present application.

Please refer to FIG. 4, FIG. 4 shows another flow of a battery assembly assembling method provided by an embodiment of the present application. According to some embodiments of the present application, if the absolute value of the difference between the actual pressing displacement amount and the preset standard pressing displacement amount is greater than the preset pressing threshold, the flow proceeds to Step S21: controlling the pressing device to move upward to be reset and press downward again.

Specifically, if the control unit detects that the absolute value of the difference between the actual pressing displacement amount and the preset standard pressing displacement amount is greater than the preset pressing threshold in step S20, it indicates that the actual pressing displacement amount does not meet requirements. In this case, the control unit controls the pressing device to move upward to be reset, then press downward again and drive the battery assembly to move downward, and then steps S10 and S20 are repeated. If the absolute value of the difference between the actual pressing displacement amount and the preset standard pressing displacement amount is subsequently detected to be less than or equal to the preset pressing threshold in step S20, step S30 is performed, and if the absolute value of the difference between the actual pressing displacement amount and the preset standard pressing displacement amount is subsequently detected to be still greater than the preset pressing threshold in step S20, the pressing device can be controlled again to move upward to be reset and press downward again, or manual intervention can be performed to check the cause.

When the absolute value of the difference between the actual pressing displacement amount and the preset standard pressing displacement amount is greater than the preset pressing threshold, the pressing device is controlled to be reset and press downward again, which can quickly eliminate the situation that the pressing displacement amount is not up to standard caused by some accidental reasons of the pressing device or structure, and reduce the time cost of assembling.

Please continue to refer to FIG. 4, according to some embodiments of the present application, if the absolute value of the difference between the first actual displacement amount and the preset first standard displacement amount is greater than the preset first displacement threshold, the clamping device is controlled to be reset and perform clamping again.

Specifically, if the control unit detects that the absolute value of the difference between the first actual displacement amount and the preset first standard displacement amount is greater than the preset first displacement threshold in step S50, it indicates that the first actual displacement amount does not meet requirements, and the flow proceeds to Step S51: controlling the clamping device to be reset.

Then step S30 and step S40 are performed again.

Specifically, it is necessary to ensure that both the first actual displacement amount and the first clamping force meet requirements at the same time. Therefore, as long as the absolute value of the difference between the first actual displacement amount and the preset first standard displacement amount is detected to be greater than the preset first displacement threshold in step S50, it is not necessary to detect whether the first clamping force meets the requirements, and the control unit needs to control the clamping device to be reset and perform clamping again, and then steps S30, S40 and S50 are performed again. When the difference between the first actual displacement amount and the preset first standard displacement amount is subsequently detected to be greater than the preset first displacement threshold, steps S30, S40, and S50 can be repeated again, or manual intervention can be performed to check the cause. Similarly, the situation that the pressing displacement amount is not up to standard due to some accidental reasons of the clamping device or structure can be quickly eliminated, and the time cost of assembling can be reduced.

Please continue to refer to FIG. 4, according to some embodiments of the present application, if the absolute value of the difference between the first clamping force and the preset first standard clamping force is greater than the preset first clamping force threshold, the clamping device is controlled to be reset and perform clamping again.

Specifically if the control unit detects that the absolute value of the difference between the first clamping force and the preset first standard clamping force is greater than the preset first clamping force threshold in step S60, it indicates that the first clamping force does not meet requirements, and the flow proceeds to Step S51: controlling the clamping device to be reset.

Then step S30 and step S40 are performed again.

Specifically, it is necessary to ensure that both the first actual displacement amount and the first clamping force meet requirements at the same time. Therefore, when the absolute value of the difference between the first clamping force and the preset first standard clamping force is detected to be greater than the preset first clamping force threshold in step S60, the control unit still needs to control the clamping device to be reset and perform clamping again even if the first actual displacement amount is detected to meet requirements, and then steps S30, S40 and S50 are performed again. When the absolute value of the difference between the first clamping force and the preset first standard clamping force is subsequently detected to be less than or equal to the first clamping force threshold, the assembling is completed. When the absolute value of the difference between the first clamping force and the preset first standard clamping force is subsequently detected to be greater than the first clamping force threshold, steps S30, S40, and S50 can be repeated again, or manual intervention can be performed to check the cause. Similarly, the situation that the pressing displacement amount is not up to standard due to some accidental reasons of the clamping device or structure can be quickly eliminated, and the time cost of assembling can be reduced.

Please continue to refer to FIG. 4, according to some embodiments of the present application, the method further includes:

Step S70: controlling the clamping device to clamp the battery assembly from a second side face of the battery assembly that is adjacent to the first side face.

Specifically, when the battery assembly is a cuboid, the first side face and the second side face are two adjacent side faces. When the battery assembly is a cylinder, the first side face and the second side face may be a quarter of arc surface respectively. Similarly, when the battery assembly is in another shape, the first side face and the second side face are adjusted accordingly to ensure that the side face of the battery assembly can be completely clamped.

In addition, it should be noted that the control unit may control the clamping device to clamp the battery assembly from the first side face first, and then from the second side face, or control the clamping device to clamp the battery assembly from the first side face and the second side face at the same time.

Step S80: acquiring a second actual displacement amount of the clamping device and a second clamping force of the clamping device clamping the second side face of the battery assembly.

Step S90: detecting the second actual displacement amount, and determining whether an absolute value of a difference between the second actual displacement amount and a preset second standard displacement amount is less than or equal to a preset second displacement threshold.

If the absolute value of the difference between the second actual displacement amount and the preset second standard displacement amount is less than or equal to the preset second displacement threshold, then the flow proceeds to Step 100: detecting the second clamping force, and determining whether an absolute value of a difference between the second clamping force and a preset second standard clamping force is less than or equal to a preset second clamping force threshold.

When the absolute value of the difference between the second clamping force and the preset second standard clamping force is less than or equal to the second clamping force threshold, the assembling is completed.

By adding the step of controlling the clamping device to clamp the battery from the second side face of the battery assembly, and detecting the second actual displacement and the second clamping force of clamping the battery from the second side face of the battery assembly, it can ensure that the battery assembly is fully clamped all around, and further ensure that all points of a welding seam between an end cover and a housing of the battery assembly meet welding requirements, ensure success rate of welding, and improve welding effect.

It can be understood that, as shown in FIG. 4, in some other embodiments of the present application, like the detection of the first actual displacement amount and the first clamping force described above, if at least one of the second actual displacement amount and the second clamping force is detected not to meet requirements in step S90 or S100, the flow proceeds to step S91: resetting the clamping device; and then the flow proceeds to steps S70, S80 and S90.

Certainly, if the battery assembly is irregular in shape, and the complete clamping of periphery edges cannot be achieved by clamping on both sides, the number of side faces to be clamped can also be increased adaptively according to the shape of the battery assembly to achieve the complete clamping of the side faces of the battery.

Figure 5:
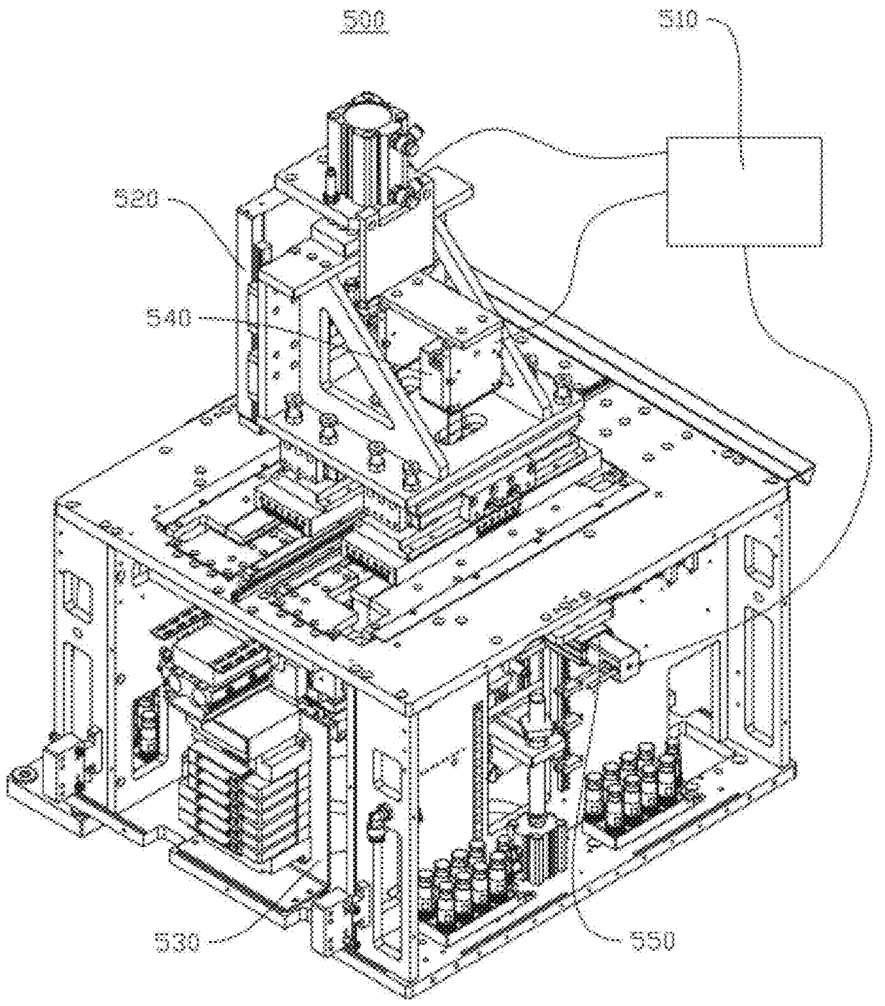
FIG. 5 is a schematic structural diagram of a battery assembly clamp provided by an embodiment of the present application.

According to another aspect of an embodiment of the present application, provided is a battery assembly clamp. Please refer to FIG. 5 for details, FIG. 5 shows a structure of a battery assembly clamp provided by an embodiment of the present application. The battery assembly clamp 500 includes: a control unit 510, and a pressing device 520, a clamping device 530, a first feedback unit 540 and a second feedback unit 550 respectively electrically connected to the control unit 510. The pressing device 520 is configured to press and drive the battery to move downward. The first feedback unit 540 is disposed on the pressing device 520, and is configured to detect an actual pressing displacement amount of the pressing device 520 moving downward and sending the actual pressing displacement amount to the control unit 510. The clamping device 530 is configured to carry and clamp the battery assembly, and clamp the battery assembly from a first side face of the battery assembly. The second feedback unit 550 is disposed on the clamping device 530, and is configured to detect a first actual displacement amount of the clamping device 530 and a first clamping force of the clamping device 530 performing clamping from the first side face of the battery assembly. The control unit 510 is configured to control the pressing device 520 to move downward, obtain the actual pressing displacement amount of the pressing device 520 moving downward, and control the clamping device 530 to clamp the battery assembly from the first side face of the battery assembly according to the actual pressing displacement amount. The control unit 510 is further configured to acquire the first actual displacement amount of the clamping device 530 and the first clamping force of the clamping device 530 performing clamping from the first side face of the battery assembly, and determine whether assembling is completed according to the first actual displacement amount and the first clamping force.

Figure 6:
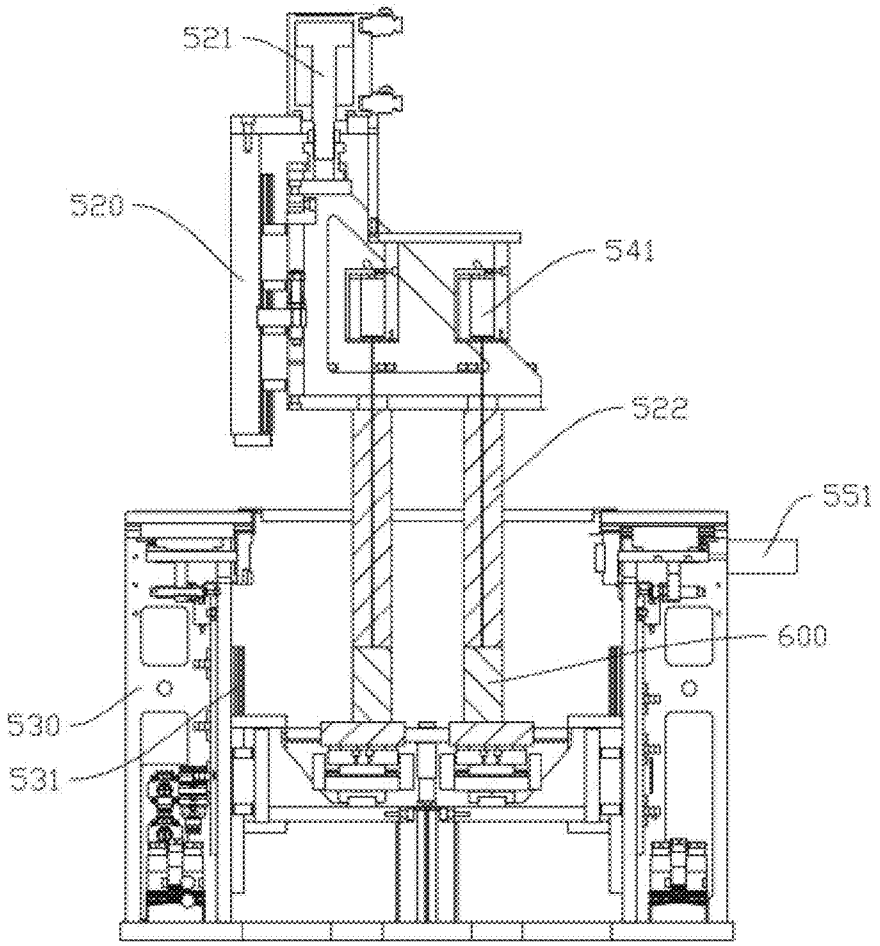
FIG. 6 is a schematic cross-sectional structure diagram of a battery assembly clamp provided by an embodiment of the present application.

Please refer to FIG. 6, FIG. 6 shows a cross-sectional structure of a battery assembly clamp provided by an embodiment of the present application. As shown in FIG. 6, a top of the pressing device 520 is provided with a drive mechanism, such as a cylinder 521 shown in FIG. 6, or an electric telescopic rod in other embodiments. Atop of a cylinder barrel of the cylinder 521 is fixed, and a piston rod of the cylinder 521 is connected with the pressing device 520 to drive the pressing device 520 to move downward. A bottom of the pressing device 520 is provided with a pressing block 522, and the pressing block 522 is configured to press the battery assembly 600 into the clamping device 530, and align a top face of the battery assembly 600 with a reference plane when the clamping device 530 performs clamping.

The first feedback unit 540 may be a displacement sensor 541 as shown in FIG. 6, which is configured to detect the pressing displacement amount of the pressing device 520 moving downward.

A first clamping plate 531 is disposed in the clamping device 530, the first clamping plate 531 is configured to move and clamp the first side face of the battery assembly 600, and a top face of the first clamping plate 531 is a reference plane for positioning the top of the battery assembly 600. When the pressing block 522 presses the battery assembly 600, it is necessary to ensure that the top face of the battery assembly 600 is aligned with the top face of the first clamping plate 531.

The second feedback unit 550 may be an electric cylinder 551. The electric cylinder 551 is a modular product that integrates a servo motor and a lead screw. A rotation motion of the servo motor is converted into a linear motion, and at the same time, advantages of the servo motor such as precise rotational speed control, precise revolution control, and precise torque control are transformed into precise speed control, precise position control, and precise thrust control, to achieve high-precision linear motion, and the electric cylinder 551 can feed back a displacement amount and a torque value to the control unit 510 in real time. The telescopic rod of the electric cylinder 551 is connected to the first clamping plate 531, which on the one hand is configured to drive the first clamping plate 531 to move to clamp the battery assembly 600, and on the other hand, feeds back a first actual displacement amount and a driving torque of the telescopic rod to the control unit 510, and then feeds back the first actual displacement amount of the first clamping plate 531 and the first clamping force applied to the battery assembly 600.

By disposing the first feedback unit 540 on the pressing device 520, the first feedback unit 540 is configured to detect the actual pressing displacement amount of the pressing device 520 moving downward and send the actual pressing displacement amount to the control unit 510 so as to realize precise positioning of the battery assembly 600. By disposing the second feedback unit 550 on the clamping device 530, the second feedback unit 550 is configured to detect the first actual displacement amount and the first clamping force of the clamping device 530 and send the first actual displacement amount and the first clamping force to the control unit 510 so as to ensure the accuracy of the clamping position and clamping force of the clamping device 530 for the battery assembly 600, and further ensure that conditions such as a defocusing amount and a welding seam during the subsequent welding of the battery assembly 600 meet requirements.

Please refer to FIG. 6 again, according to some embodiments of the present application, the first feedback unit 540 includes a displacement sensor 541.

The displacement sensor, also known as linear sensor, is a linear device attributed to metal induction. The function of the sensor is to convert various measured physical quantities into electricity. In a production process, measurement of displacement is generally divided into two types: measurement of physical size and mechanical displacement. According to different transformation forms of the measured variable, the displacement sensor may be divided into two types: an analog type and a digital type. The analog type may also be divided into a physical type and a structural type. Commonly used displacement sensors are mostly of analog structural types, including potentiometer displacement sensors, inductive displacement sensors, auto-alignment machines, capacitive displacement sensors, eddy current displacement sensors, Hall displacement sensors, and the like. An important advantage of digital displacement sensors is the convenience of sending a signal directly into a computer system. This kind of sensor develops rapidly and is widely applied.

By setting the first feedback unit 540 as the displacement sensor 541, it is possible to effectively ensure accurate measurement of the pressing displacement amount of the pressing device 520, thereby ensuring that a defocusing amount between a welding plane and a welding head of the battery assembly 600 meet requirements, and ensuring success rate of welding.

Figure 7:
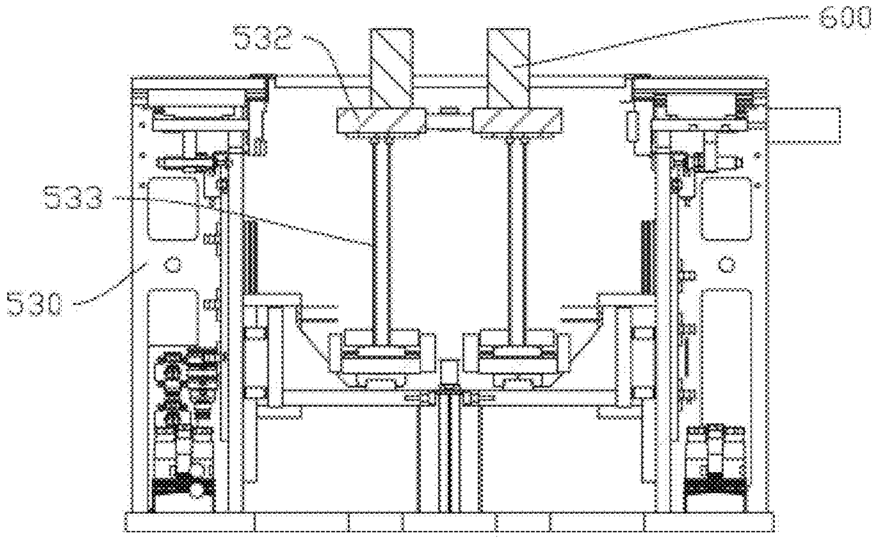
FIG. 7 is a schematic cross-sectional structure diagram of a clamping device in a battery assembly clamp provided by an embodiment of the present application.

Please refer to FIG. 7, FIG. 7 shows an internal structure of a clamping device 530 in a battery assembly clamp provided by an embodiment of the present application. According to some embodiments of the present application, a carrying platform 532 for placing the battery assembly 600 is disposed in the clamping device 530, a bottom of the carrying platform 532 is connected to the clamping device 530 through a first elastic member 533, and the first elastic member 533 is configured to provide an upward elastic force for the carrying platform 532.

The carrying platform 532 is disposed inside the clamping device 530 and is a plate or block structure with a plane for placing the battery assembly 600.

The first elastic member 533 may be a spring, a shrapnel, or the like. The bottom of the carrying platform 532 is connected to the clamping device 530 through the first elastic member 533. The first elastic member 533 is configured to provide the upward elastic force for the carrying platform 532. When the battery assembly 600 is not pressed down, the first elastic member 533 lifts the carrying platform 532 to the top of the clamping device 530, which on the one hand ensures the stability of the battery assembly 600 when it is placed on the carrying platform 532, and on the other hand, ensures that when the battery assembly 600 is discharged, the battery assembly 600 can be sent out from the top of the clamping device 530 through the first elastic member 533.

Figure 8:
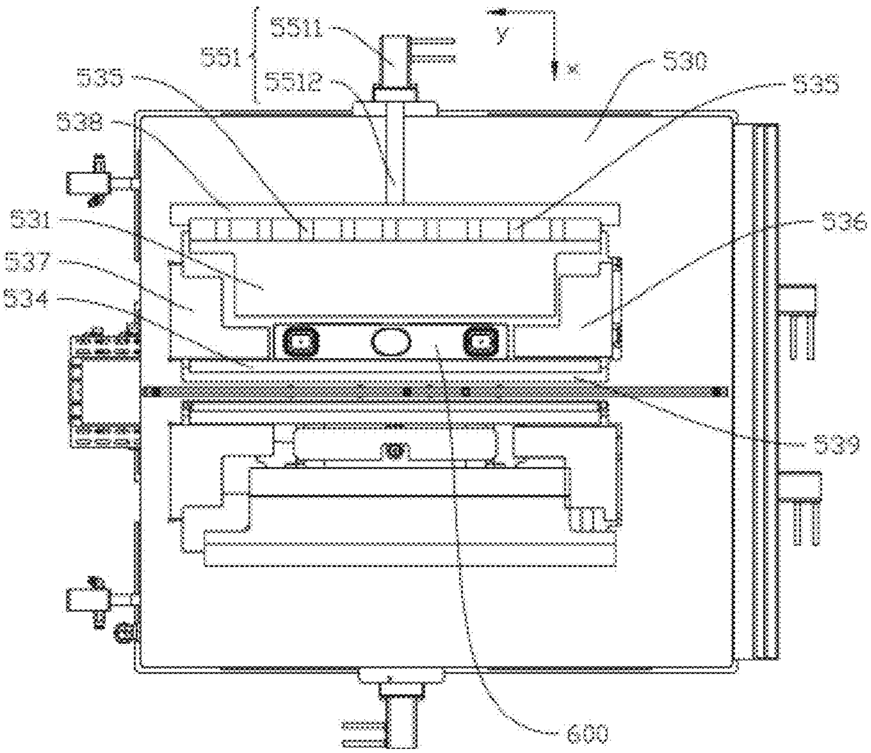
FIG. 8 is a schematic structural diagram of a top view of an interior of a clamping device in a battery assembly clamp provided by an embodiment of the present application.

Please refer to FIG. 8, FIG. 8 shows a top view structure inside a clamping device in a battery assembly clamp provided by an embodiment of the present application. According to some embodiments of the present application, a restraint plate 534 is disposed in the clamping device 530, a movable first clamping plate 531 is disposed at a position opposite to the restraint plate 534 in the clamping device 530, and the first clamping plate 531 is configured to clamp the battery assembly 600 from the first side face of the battery assembly 600 when the first clamping plate 531 moves, so that the battery assembly 600 is clamped between the first clamping plate 531 and the restraint plate 534.

The restraint plate 534 is a plate structure fixed in the clamping device 530. For the assembling of the cuboid battery assembly 600 as shown in FIG. 8, the first clamping plate 531 is disposed in parallel with the restraint plate 534. The first clamping plate 531 may be slidably disposed in the clamping device 530 through a slide rail structure, and a sliding direction of the first clamping plate 531 is an x-axis direction in FIG. 8.

By disposing the restraint plate 534 in the clamping device 530, the movable first clamping plate 531 is disposed at a position opposite to the restraint plate 534, so that the battery assembly 600 can be firmly clamped between the first clamping plate 531 and the restraint plate 534 when the first clamping plate 531 moves.

Please continue to refer to FIG. 8, according to some embodiments of the present application, the second feedback unit 550 includes an electric cylinder 551, and the electric cylinder 551 is connected to the first clamping plate 531 for driving the first clamping plate 531 to move.

Specifically, as shown in FIG. 8, the electric cylinder 551 includes a cylinder barrel 5511 and a telescopic rod 5512, the cylinder barrel is fixed on the clamping device 530, and an end of the telescopic rod 5512 is connected to the first clamping plate 53. By controlling the sliding of the telescopic rod 5512, driving of the first clamping plate 531 is realized.

By setting the second feedback unit 550 as the electric cylinder 551, and the electric cylinder 551 to be connected to the first clamping plate 531, not only the driving of the first clamping plate 531 is realized, but also detection and feedback of the first actual displacement amount of the first clamping plate 531 and the first clamping force of the first clamping plate 531 for the battery assembly 600 can be realized.

Please continue to refer to FIG. 8, according to some embodiments of the present application, the first clamping plate 531 is connected to the electric cylinder 551 through a second elastic member 535, so that the first clamping plate 531 is able to be tilt against the first side face of the battery assembly 600.

As shown in FIG. 8, a plurality of second elastic members 535 may be disposed between the first clamping plate 531 and the electric cylinder 551, and the second elastic member 535 may be a spring, a shrapnel, or the like. The first clamping plate 531 is connected to the electric cylinder 551 through the second elastic members 535 so that the first clamping plate 531 is able to be tilted to a certain extent. If the first side face of the battery assembly 600 is tilted to a certain extent due to production reasons, the first clamping plate 531 moves and contacts the first side face of the battery assembly 600 so as to clamp the battery assembly 600, and the first clamping plate 531 is able to be tilted correspondingly with the tilting of the first side face, so that the first clamping plate 531 exerts the more uniform clamping force on the first side face of the battery assembly 600, and exhibits an ability of self-adaptive adjustment for clamping the battery assembly 600 to ensure the reliability of clamping.

Please refer to FIG. 8 again, according to some embodiments of the present application, a movable second clamping plate 536 is further disposed in the clamping device 530, and the second clamping plate 536 is configured to clamp the battery assembly 600 from a second side face of the battery assembly 600 that is adjacent to the first side face when the second clamping plate 536 moves.

Similarly, a fixing plate 537 may further be fixed in the clamping device 530, and the second clamping plate 536 is disposed opposite to the fixing plate 537. For a cuboid battery as shown in FIG. 8, the second clamping plate 536 and the fixing plate 537 are parallel to each other, and the second clamping plate 536 can move in a y-axis direction in FIG. 8, and clamp the battery assembly 600 from the second side face of the battery assembly 600.

By disposing the movable second clamping plate 536 in the clamping device 530, the second clamping plate 536 is configured to clamp the battery assembly 600 from a second side face of the battery assembly 600 that is adjacent to the first side face when the second clamping plate 536 moves, so as to clamp the battery assembly 600 completely and fully, thereby ensuring that a welding seam on a welding plane of the battery assembly meets requirements and ensuring success rate of welding.

Please continue to refer to FIG. 8, according to some embodiments of the present application, both the restraint plate 534 and the first clamping plate 531 are able to move in a moving direction of the second clamping plate 536.

Specifically, as shown in FIG. 8, a first slide rail 538 may be disposed on the end of the telescopic rod 5512 of the electric cylinder 551 along the y-axis direction, the first clamping plate 531 may be slidably disposed on the first slide rail 538, and the restraint plate 534 may be fixed on the clamping device 530 through a second slide rail 539 disposed along the y-axis direction. After the first clamping plate 531 clamps the battery assembly 600, when the second clamping plate 536 moves along the y-axis direction and clamps the battery assembly 600, the first clamping plate 531 and the restraint plate 534 can move with the battery assembly 600 to ensure that both the first clamping plate 531 and the restraint plate 534 remain relatively stationary with the battery assembly 600.

By setting the restraint plate 534 and the first clamping plate 531 to be able to move in the moving direction of the second clamping plate 536, it ensures that when the second clamping plate 536 moves along the y-axis direction and clamps the battery assembly 600, the first clamping plate 531 and the restraint plate 534 can move with the battery assembly 600 to prevent friction between the battery assembly 600 and the first clamping plate 531 and the restraint plate 534, so as not to cause abrasion or even damage to the surface of the battery assembly 600.

According to yet another aspect of an embodiment of the present application, a welding device is further provided, and the welding device includes the battery assembly clamp 500 in any one of the above embodiments.

The welding device is applied in the production line of a battery. When the battery assembly 600 is clamped by the battery assembly clamp 500, the pressing device 520 moves upward, so that structures between the pressing device 520 and the clamping device 530 no longer interfere with each other, and then the clamping device 530 is transferred to a welding station of the welding device for welding.

By disposing the first feedback unit 540 on the pressing device 520, the first feedback unit 540 is configured to detect the actual pressing displacement amount of the pressing device 520 moving downward and send the actual pressing displacement amount to the control unit 510 so as to realize precise positioning of the battery assembly 600. By disposing the second feedback unit 550 on the clamping device 530, the second feedback unit 550 is configured to detect the first actual displacement amount and the first clamping force of the clamping device 530 and send the first actual displacement amount and the first clamping force to the control unit 510 so as to ensure the accuracy of the clamping position and clamping force of the clamping device 530 for the battery assembly 600, and further ensure that conditions such as a defocusing amount and a welding seam during welding of the battery assembly 600 by the welding device meet requirements.

Finally, it should be noted that: the above embodiments are only used to illustrate the technical solutions of the present application, and are not intended to make limitation; although the present application has been described in detail with reference to the foregoing embodiments, those of ordinary skill in the art should understand that it is still possible to modify the technical solutions described in the foregoing embodiments, or perform equivalent replacements for some or all of the technical features; and these modifications or replacements do not make the essence of the corresponding technical solutions deviate from the technical solutions of various embodiments of the present application. All of them should be covered by the scope of the claims and description of the present application. In particular, as long as there is no structural conflict, the technical features mentioned in the various embodiments can be combined in any manner. The present application is not limited to the specific embodiments disclosed herein, but includes all technical solutions falling within the scope of the claims.

What is claimed is:

1. A battery assembly clamp, comprising: a controller, a press, a clamper, a first feedback structure and a second feedback structure respectively electrically connected to the controller, wherein the press presses and drives a battery assembly to move downward;

the first feedback structure is disposed on the press, and detects an actual pressing displacement amount of the press moving downward and send the actual pressing displacement amount to the controller;

the clamper carries the battery assembly, and clamps the battery assembly from a first side face of the battery assembly;

the second feedback structure is disposed on the clamper, and detects a first actual displacement amount of the clamper and a first clamping force of the clamper performing clamping from the first side face of the battery assembly, and send the first actual displacement amount and the first clamping force to the controller;

the controller is configured to control the press to move downward, acquire the actual pressing displacement amount of the press moving downward, and control the clamper to clamp the battery assembly from the first side face according to the actual pressing displacement amount; and the controller is further configured to acquire the first actual displacement amount of the clamper and the first clamping force of the clamper performing clamping from the first side face, and determine whether assembling is completed according to the first actual displacement amount and the first clamping force.

2. The battery assembly clamp according to claim 1, wherein the first feedback structure comprises a displacement sensor.

3. The battery assembly clamp according to claim 1, wherein a carrying platform for placing the battery assembly is disposed in the clamper, a bottom of the carrying platform is connected to the clamper through a first elastic structure, and the first elastic structure provides an upward elastic force for the carrying platform.

4. The battery assembly clamp according to claim 1, wherein a restraint plate is disposed in the clamper, a movable first clamping plate is disposed at a position opposite to the restraint plate in the clamper, and the first clamping plate is configured to clamp the battery assembly from the first side face of the battery assembly when the first clamping plate moves, so that the battery assembly is clamped between the first clamping plate and the restraint plate.

5. The battery assembly clamp according to claim 4, wherein the second feedback structure comprises an electric cylinder, and the electric cylinder is connected to the first clamping plate for driving the first clamping plate to move.

6. The battery assembly clamp according to claim 5, wherein the first clamping plate is connected to the electric cylinder through a second elastic structure, so that the first clamping plate is able to be tilted against the first side face of the battery assembly.

7. The battery assembly clamp according to claim 4, wherein a movable second clamping plate is further disposed in the clamper, and the second clamping plate is configured to clamp the battery assembly from a second side face of the battery assembly that is adjacent to the first side face when the second clamping plate moves.

8. The battery assembly clamp according to claim 7, wherein both the restraint plate and the first clamping plate are able to move in a moving direction of the second clamping plate.

9. The battery assembly clamp according to claim 1, wherein the controller is configured to:

detect the actual pressing displacement amount;

control the clamper to clamp the battery assembly from the first side face of the battery assembly if an absolute value of a difference between the actual depressing displacement amount and a preset standard depressing displacement amount is less than or equal to a preset depressing threshold;

detect the first actual displacement amount and the first clamping force; and determine that the assembling is completed if an absolute value of a difference between the first actual displacement amount and a preset first standard displacement amount is less than or equal to a preset first displacement threshold, and an absolute value of a difference between the first clamping force and a preset first standard clamping force is less than or equal to a preset first clamping force threshold.

10. A welding device, comprising the battery assembly clamp according to claim 1.

* * * * *